Feb. 17, 1942.    F. J. HEALEY    2,273,404
VARIABLE VELOCITY RATIO GEARING
Filed April 22, 1940    4 Sheets-Sheet 1
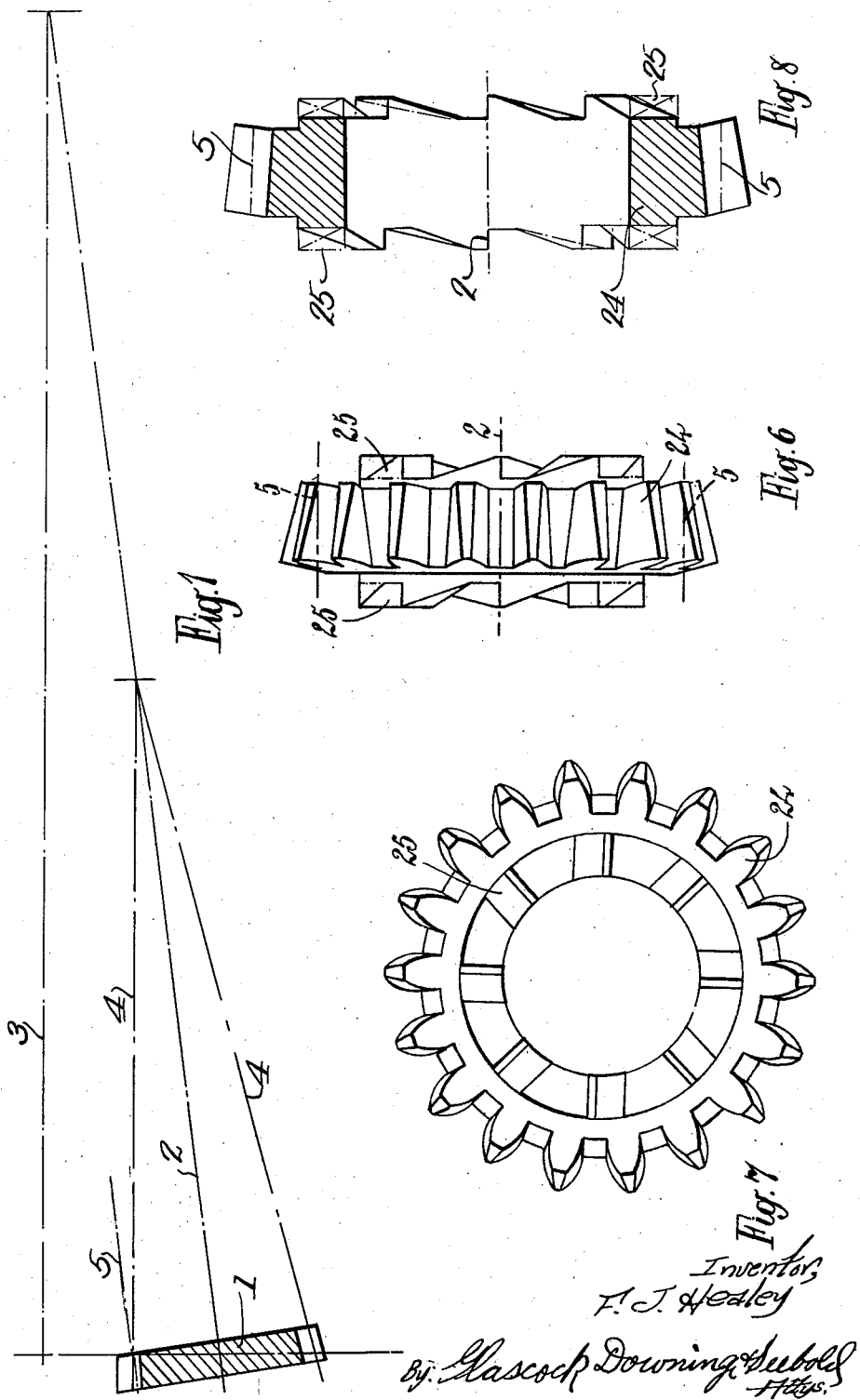

Feb. 17, 1942.  F. J. HEALEY  2,273,404
VARIABLE VELOCITY RATIO GEARING
Filed April 22, 1940  4 Sheets-Sheet 2
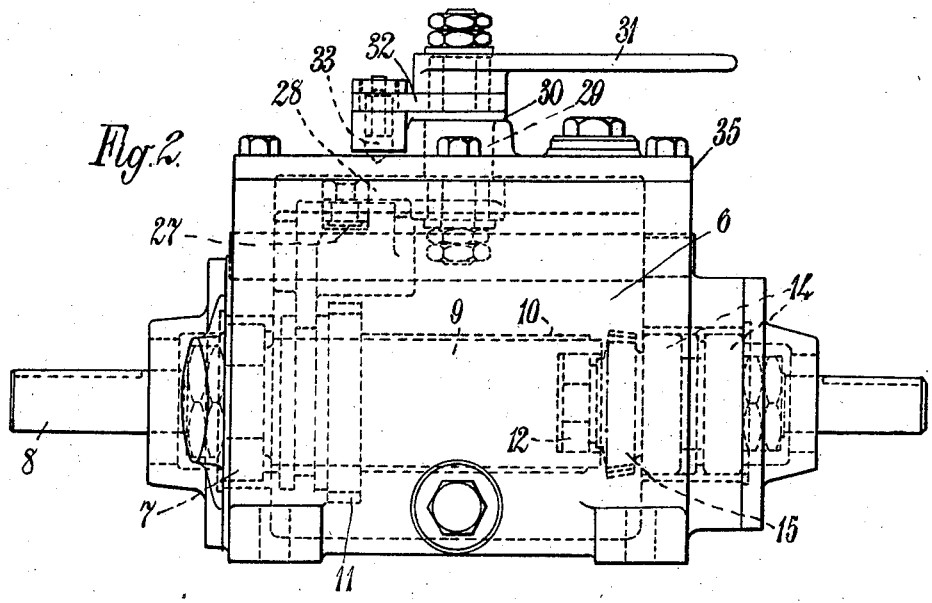
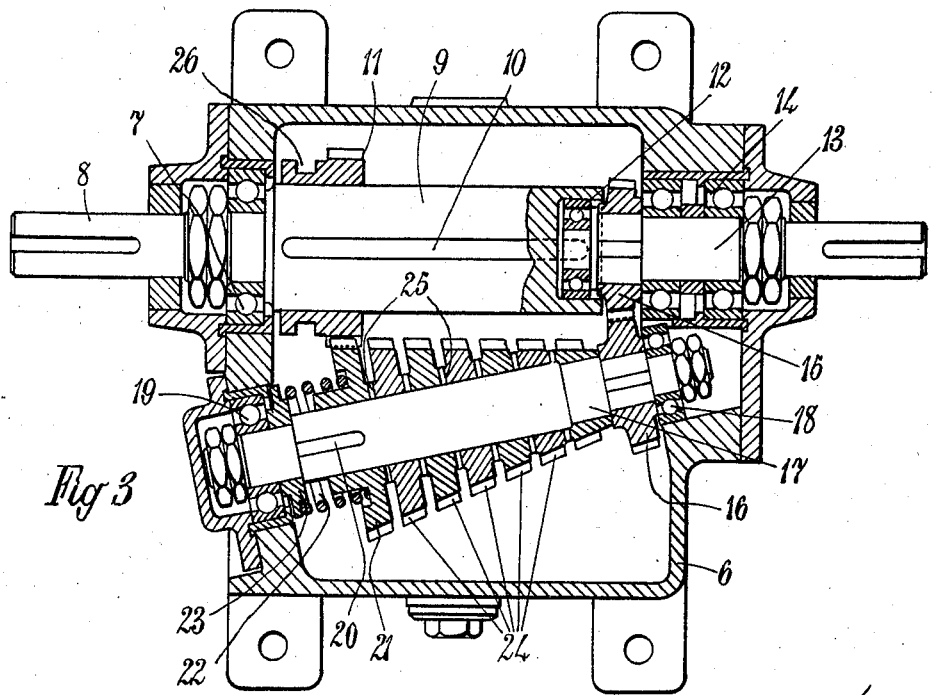
Inventor,
F. J. Healey
By: Glascock Downing & Seebold
Attys.

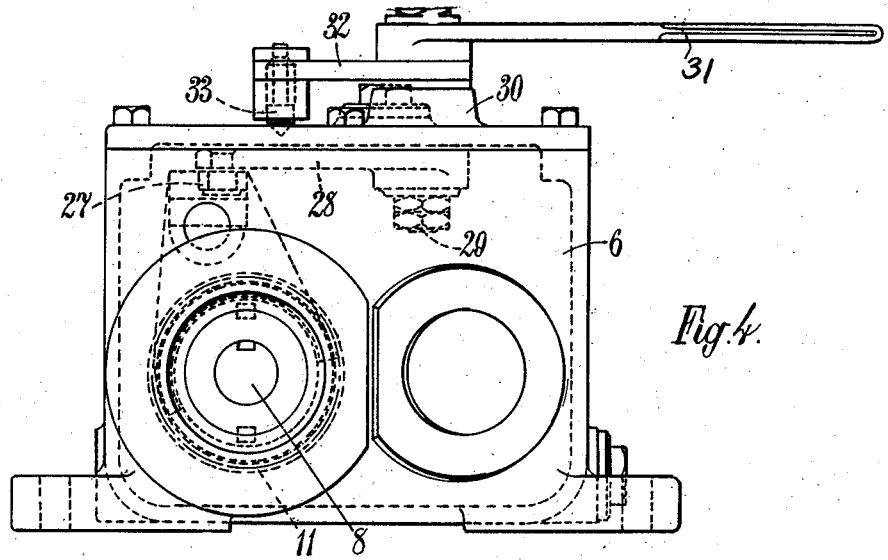
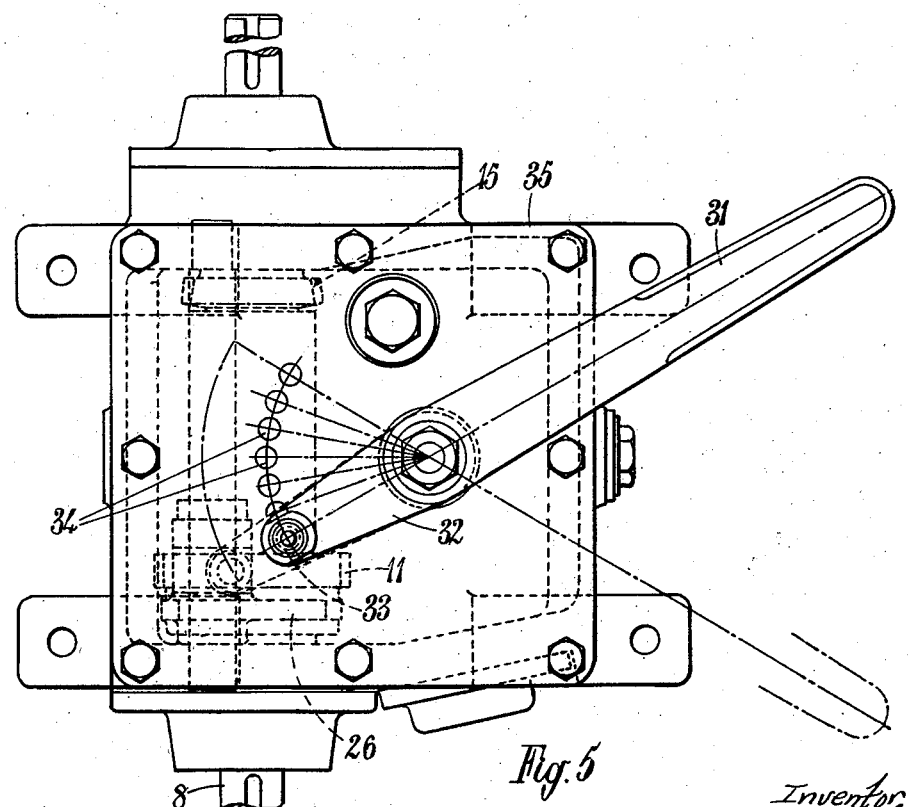

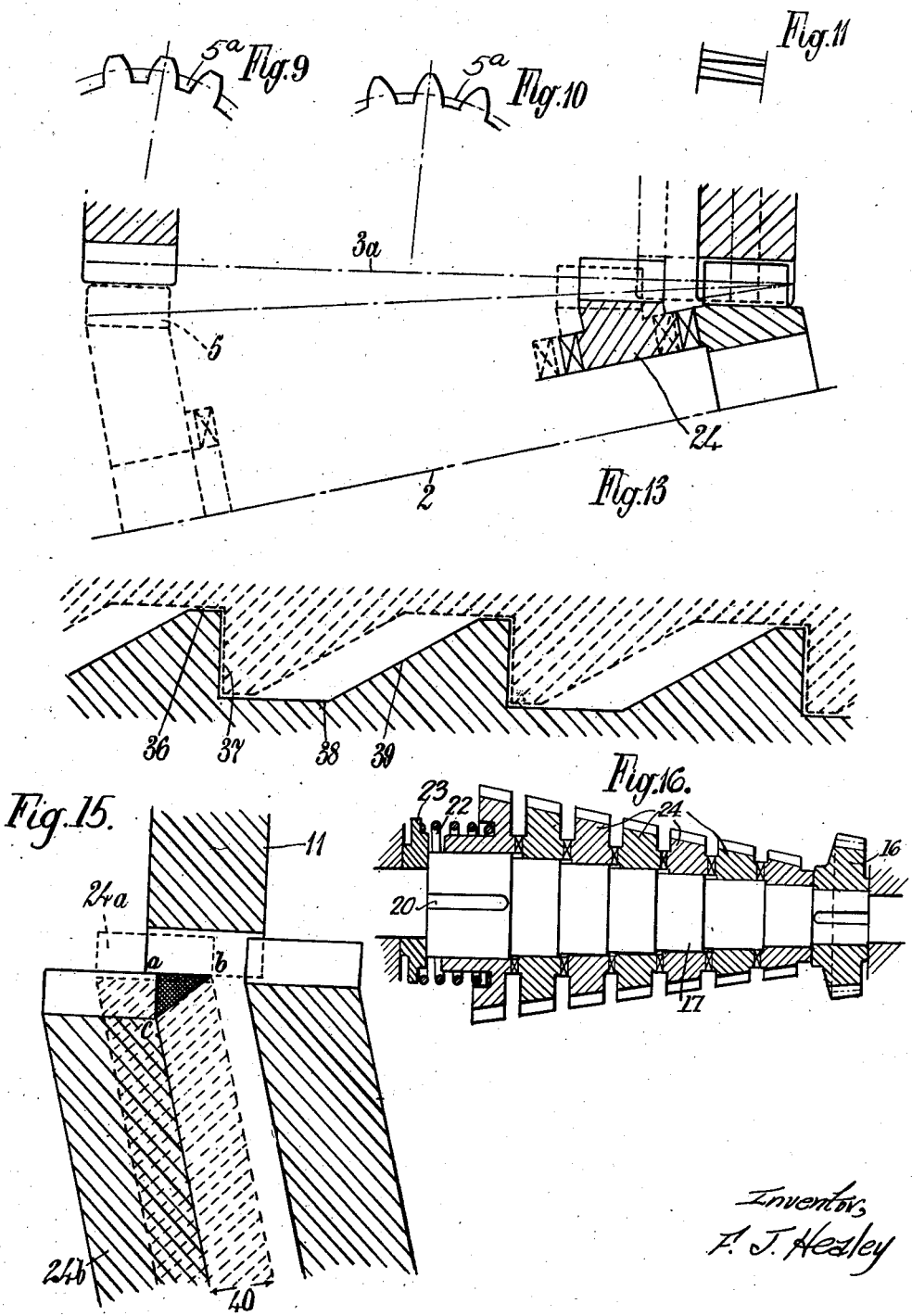

Patented Feb. 17, 1942

2,273,404

UNITED STATES PATENT OFFICE 2,273,404

VARIABLE VELOCITY RATIO GEARING

Francis Jeremiah Healey, Surbiton, England

Application April 22, 1940, Serial No. 331,029
In Great Britain February 20, 1939

7 Claims. (Cl. 74—348)

This invention relates to conical toothed wheels and more particularly to wheels as used in variable velocity ratio gearing of the type in which a plurality of such wheels of different diameters are arranged adjacent to one another on a common axis and together form a composite member of substantially the form of a toothed cone and a toothed wheel is mounted on a shaft arranged substantially parallel with the generating line of the cone so as to be capable of being moved in an axial direction to engage one or other of the conical toothed wheels in order to secure a driving connection at one or other of a plurality of velocity ratios. The invention also extends to improved gearing of this kind.

Variable velocity ratio gearing of this kind is described in specification No. 1,817,819.

One object of the invention is to provide an improved form of conical toothed wheel adapted to secure a more satisfactory driving connection than has been possible with such wheels as have hitherto been employed in gearing of the kind referred to.

A further object of the invention is to provide an improved gear of the kind in question.

According to the invention the teeth of the conical wheels are cut by means of a generating hobbing cutter of the kind adapted to form a spur wheel gearing with the pinion employed in the variable speed gear in such manner that the actual pitch line does not remain parallel with the external surface of the cone-shaped blank but is, in fact, parallel to the axis of rotation of the cone-shaped blank.

In cutting the teeth the generating hobbing cutter is set to cut on an axis parallel to the top of the teeth of the wheel and the blank to be cut is also set at an angle corresponding with the enclosed angle between the wheels which are cut and the engaged driven or driving pinion of the gear.

The invention will be described further in detail and by way of example with reference to the accompanying drawings, in which—

Figure 1 illustrates diagrammatically the general characteristics of one of the conical toothed wheels in accordance with the invention.

Figure 2 is a view in side elevation,

Figure 3 being a corresponding sectional plan view.

Figure 4 is a view in end elevation,

Figure 5 is a corresponding view in plan of one construction of gearing in accordance with the invention.

Figure 6 is a view in side elevation of one of the conical wheels thereof,

Figure 7 being a corresponding view in end elevation,

Figure 8 a view in cross-section of one of the wheels on an enlarged scale, while Figures 9 and 10 are respectively views showing the faces of the teeth, Figure 11 is a view in plan of a tooth, Figure 12 is a fragmentary view in elevation, Figure 13 is a fragmentary view illustrating the displacement of the wheels in moving the pinion from engagement with one of the conical wheels to interengagement with another of the conical wheels, Figure 14 is a developed view showing the dog clutch construction, and Figure 15 is a diagrammatic representation illustrating more clearly the character of the displacement of the dog clutch elements between the wheels, and Figure 16 is an elevation in section illustrating the employment of a stepped shaft for the conical toothed wheels.

The general character of the conical wheel may be ascertained from Figure 1 of the drawings, in which I indicates the wheel, 2 its axis of rotation, 3 is the axis about which the spur wheel co-operating with the conical wheel rotates, 4 are lines parallel with the external surfaces of the cone-shaped blank which would include the pitch lines of the teeth formed on the blank if cut in the more usual way, while 5 is the actual pitch line of the tooth when formed in accordance with the invention.

As will be seen, this pitch line is parallel to the axis of the cone-shaped wheel and is therefore not parallel with the centre line of the axis of rotation of the spur wheel with which it will co-operate.

The pitch line, as will be seen, is at an angle with the top of the teeth and is at right angles to the face of the wheel, as shown in the drawings, and intersects the line 4 at the smaller face of the wheel.

As will be seen from this figure, the enclosed angle of engagement between the cone-shaped wheels and the spur pinion is the same as the angle between the smaller face of the wheel and the line perpendicular to the centre line of the spur pinion.

In some cases it will be found advantageous so to cut a cone-shaped blank that the pitch line on the smaller face of the cone wheel does not coincide with the normal depth of addendum, but may be slightly below or above such normal position in order to conserve the strength of tooth at the smaller face or the height of the addendum at the larger face, this being rendered possible with the tooth generation method of cutting above described.

In some cases the portion of the tooth above the pitch line towards the larger end of the wheel may be removed. In this case the addendum will progressively increase from the smaller end of the wheel to a position more or less adjacent to the larger end of the wheel and will thereafter decrease.

Variable velocity ratio gearing in accordance with the invention will include a plurality of conical toothed wheels of the form above described adapted to be engaged by a spur pinion.

Referring to Figures 2 to 5, 6 is a casing or housing for the gear in one end of which is provided a bearing 7 for a driving shaft 8 furnished with an enlarged portion 9 in which are provided feathers one of which is indicated by the reference 10 by which the pinion 11 is slidably engaged on the shaft.

In the end of the shaft there is provided a bearing 12 for the end of the driving shaft 13 which is engaged in bearings 14 in the casing. On this shaft there is rigidly secured a bevel pinion 15 meshing with the bevel pinion 16 keyed to the shaft 17 engaged in bearings 18 and 19 in the ends of the casing.

On this shaft and engaged therewith by a feather 20 is a conical toothed wheel 21 having teeth formed in the manner above described, and with this wheel is associated a spring 22 one end of which bears against the wheel and the other on the thrust plate 23.

In addition, on the shaft there are provided further conical wheels 24 formed in the manner above described. These wheels are not secured to the shaft otherwise than by the engagement of dog clutch elements 25 formed on their faces (see Figure 6).

These dog clutch elements are formed on both of the faces of the wheels 24 except the end-most one, which is formed as one face only with such elements. On one face of the wheel 21 such dog clutch elements are also provided.

For moving the pinion 11 into engagement with one or other of the several wheels 24, its nave is provided with a circumferential channel 26 engaged by a pin 27 on an arm 28 secured to a spindle 29 arranged in a bearing 30 and furnished with a hand lever 31 which is provided with an arm 32 in which is engaged a spring-pressed plunger 33 adapted to be moved into engagement with one or other of the recesses or holes 34 in the cover plate 35 of the casing.

The form and character of the teeth of the wheels may be more clearly seen from Figures 6 to 12, Figure 6 also showing generally the form of the clutch elements 25.

In these figures so far as is possible the same references are used as are used in Figure 1, the wheel itself, however, being indicated by the reference 24, that is to say, 2 indicates the axis of rotation of the wheel, 3a is a line parallel with the axis about which the spur wheel co-operating with the conical wheel rotates, while 5 is the actual pitch line of the tooth and 5a the pitch circle.

Referring to Figure 14, which is a developed view of the dog clutch element, 36 is the flat surface of the apex of the teeth of the dog clutch elements, 37 is the buttress face at 90° to the wheel, 38 is the flat surface at the root of the tooth and 39 is the inclined surface of the tooth.

The operation of the clutch may be followed from Figure 15 in which 11 indicates the sliding pinion and 24, 24a two adjacent conical wheels.

In this figure the sliding pinion is shown sliding out from 24 and still in engagement therewith but moving into engagement with the cone wheel 24a.

In doing so this wheel, due to the relative difference in its speed of rotation, rides up the dogs thereby rotating about and moving along the cone wheel shaft to the position indicated by 24b thereby becoming disengaged from the pinion 11, 40 representing the distance moved by the cone wheel which is equal to the sum of the height of the two dogs which are engaged.

While in the construction described in detail with reference to the drawings the largest of the conical wheels is keyed to the layshaft, it is not necessary that this wheel should be so engaged with the shaft and in fact it is found preferable, in some cases, to arrange one of the intermediate conical wheels on a key on the layshaft.

The problem resolves itself into the solution of the triangle *abc* shown in deep shading. Where the wheel 24 remains in engagement with 11 the height *ac* must be greater than *bc* times sin. angle *b*.

Where $ac$ = the overall height of the teeth
$bc$ = the sum of the heights of two dogs, and
angle $b = \theta$, which is the angle of the layshaft to the sliding wheel shaft.

This form of dog clutch element may, within the scope of the invention, be incorporated in any variable velocity ratio gearing of the general type with which the invention is concerned.

Instead of employing dog clutch elements between the adjacent wheels, where it is desired to mesh the teeth and the cone wheels with the sliding pinion with the minimum amount of lateral displacement between them, a one-way clutch or free wheel device of any convenient form may be used.

The diameter of the layshaft carrying the cone wheels is preferably increased by steps at definite intervals along its length in the manner indicated in Figure 16 of the drawings, in order that the length of travel along the shaft of any set of cone wheels is limited to a definite amount, which shall be called X.

This distance is linked up with (1) the number of wheels running on the same length of constant diameter of the layshaft $= (N)$;
(2) the angle of the layshaft to the sliding shaft $= (\theta)$;
(3) the height of the gear teeth (addendum plus dedendum) $= (H)$;
(4) the depth of the dogs on the gear $= (D)$.

Therefore where $X = D \times N$ $$D = \left( \frac{\frac{H}{2} \div \sin \theta}{N} \right)$$

$$\therefore \quad X = \left( \frac{\frac{H}{2}}{\sin \theta} \right) + \left\{ \begin{array}{l} \text{width of gears across the roots} \\ \text{the dogs } X \text{ N.} \end{array} \right.$$

This ensures that the cone wheels may not be thrown so far back along the layshaft as to come completely out of mesh with the sliding wheel, and thus cause failure.

I claim:

1. Variable velocity ratio gearing comprising a plurality of conical toothed wheels of different diameter arranged adjacent to one another on a common axis and together forming a composite member of substantially the form of a toothed cone, the teeth on the conical toothed wheels being spur teeth the actual pitch lines of which are parallel with the axis of rotation of the cone, and a displaceable toothed wheel mounted on a shaft arranged substantially parallel with the generating line of the cone so as to be capable of being moved in an axial direction to engage one or other of the conical toothed wheels in order to secure a driving connection at one or other of a plurality of velocity ratios.

2. Variable velocity ratio gearing comprising a plurality of conical toothed wheels of different diameter arranged adjacent to one another on a common axis and together forming a composite member of substantially the form of a toothed cone, the teeth on the conical toothed wheels being spur teeth the actual pitch lines of which are parallel with the axis of rotation of the cone and are displaced from the normal depth of addendum to conserve the strength of tooth at the smaller face or the height of the addendum at the larger face, and a displaceable toothed wheel mounted on a shaft arranged substantially parallel with the generating line of the cone so as to be capable of being moved in an axial direction to engage one or other of the conical toothed wheels in order to secure a driving connection at one or other of a plurality of velocity ratios.

3. Variable velocity ratio gearing comprising a plurality of conical toothed wheels of different diameter arranged adjacent to one another on a common axis and together forming a composite member of substantially the form of a toothed cone, the teeth on the conical toothed wheels being spur teeth the actual pitch lines of which are parallel with the axis of rotation of the cone, and portions of the said teeth above the pitch lines towards the larger end of the lines being removed, and a displaceable toothed wheel mounted on a shaft arranged substantially parallel with the generating lines of the cone so as to be capable of being moved in an axial direction to engage one or other of the conical toothed wheels in order to secure a driving connection at one or other of a plurality of velocity ratios.

4. Variable velocity ratio gearing comprising a plurality of conical toothed wheels of different diameter arranged adjacent to one another on a common axis and together forming a composite member of substantially the form of a toothed cone, the teeth on a conical toothed wheel being spur teeth the actual pitch lines of which are parallel with the axis of rotation of the cone, dog toothed elements on the faces of the conical toothed wheels adapted to permit a predetermined degree of relative rotational movement between adjacent conical toothed wheels without such movement being accompanied by relative axial displacement of the said wheels, and a displaceable toothed wheel mounted on a shaft arranged substantially parallel with the generating line of the cone so as to be capable of being moved in an axial direction to engage one or other of the conical toothed wheels in order to secure a driving connection at one or other of a plurality of velocity ratios.

5. Variable velocity ratio gearing comprising a plurality of conical toothed wheels of different diameter arranged adjacent to one another on a common axis and together forming a composite member of substantially the form of a toothed cone, the teeth on the conical toothed wheels being spur teeth the actual pitch lines of which are parallel with the axis of rotation of the cone, dog tooth elements formed on the faces of the conical toothed wheels, a flat surface provided between the base of the trailing surface of each of the dog teeth and the base of the leading surface of the next adjacent tooth so as to leave dead spaces between each of the adjacent teeth which will allow for a certain degree of lost motion between each conical toothed wheel and the next adjacent conical toothed wheel before the trailing surfaces of the dog teeth of one wheel commence to ride up the trailing surfaces of the dog teeth of the next adjacent wheel, and a displaceable toothed wheel mounted on a shaft arranged substantially parallel with the generating line of the cone so as to be capable of being moved in an axial direction to engage one or other of the conical toothed wheels in order to secure a driving connection at one or other of a plurality of velocity ratios.

6. Variable velocity ratio gearing as claimed in claim 5 in which the apex of each of the dog teeth is formed with a flat surface adapted to bear against the flat surfaces between the dog teeth on the co-operating conical toothed wheel.

7. Variable velocity ratio gearing comprising a plurality of conical toothed wheels of different diameter arranged adjacent to one another on a common lay shaft and together form a composite member of substantially the form of a toothed cone, the teeth on the conical toothed wheels being spur teeth the actual pitch lines of which are parallel with the axis of rotation of the cone and the diameter of the layshaft carrying the conical toothed wheels being increased by steps at different intervals along its length in order that the length of travel along the shaft of any set of conical toothed wheels is limited to a definite amount, dog tooth elements on the faces of the conical tooth wheels adapted to permit a predetermined degree of relative rotational movement between the conical toothed wheels without such movement being accompanied by relative axial displacement of the tooth wheels, and a displaceable toothed wheel mounted on a shaft arranged substantially parallel with the generating line of the cone so as to be capable of being moved in an axial direction to engage one or other of the conical toothed wheels in order to secure a driving connection at one or other of a plurality of velocity ratios.

FRANCIS JEREMIAH HEALEY.